United States Patent [19]

Taylor

[11] 4,268,723

[45] May 19, 1981

[54] CIRCUITS AND METHODS FOR INITIALIZING THE LOOP CURRENT OF A TELEPHONE SET

[75] Inventor: Raymond G. Taylor, Shreveport, La.

[73] Assignee: Western Electric Company, New York, N.Y.

[21] Appl. No.: 72,252

[22] Filed: Sep. 4, 1979

[51] Int. Cl.³ ............................................. H04M 1/00
[52] U.S. Cl. ................................. 179/81 R; 179/16 F
[58] Field of Search ................. 179/81 R, 81 A, 16 F, 179/170 R, 170.2, 170.8, 77, 70

[56] References Cited

U.S. PATENT DOCUMENTS

| | | | |
|---|---|---|---|
| 3,800,095 | 3/1974 | Cowpland | 179/77 |
| 3,906,167 | 9/1975 | Baker | 179/81 R |
| 4,143,247 | 3/1979 | Yoshitoshi et al. | 179/81 R |

OTHER PUBLICATIONS

W. F. Chow et al., "MAC-4: A Single-Chip Microcomputer", The Bell System Technical Journal, vol. 58, No. 4, pp. 959-962, Apr. 1979.

*Primary Examiner*—Joseph A. Popek
*Attorney, Agent, or Firm*—J. L. Landis

[57] ABSTRACT

The loop current ($I_x$) of a telephone set speech network (11) is automatically initialized at a desired level independent of the central office voltage applied to the input terminals (12, 13) of the set and thus independent of transmission line loop length and other variables. For this purpose, a variable conductance device (20), sush as a Darlington driver (Q1), is connected between the input terminals and the speech network so as to establish a loop current at a circuit node (N1) that is a function of the supply voltage and the conductivity of the device. The loop current is monitored, as by a Schmitt trigger circuit (30), and the conductance of the device (20) is varied accordingly so as to initialize the loop current at the desired level, as by selectively connecting a plurality of resistors (R2 . . . R7) individually and collectively between a base node (26) of the driver (Q1) and the ring lead (17) of the set.

10 Claims, 2 Drawing Figures

CIRCUITS AND METHODS FOR INITIALIZING THE LOOP CURRENT OF A TELEPHONE SET

FIELD OF THE INVENTION

This application relates generally to circuits and methods for initializing the loop current of a telephone set at a selected level independent of the central office supply voltage to the set and thus independent of transmission line loop length and impedance. These systems are of especial interest for use in conjunction with proposed new low-power electronic telephone sets that can be powered solely from the central office line inputs.

BACKGROUND OF THE INVENTION

In conventional telephone systems, the line input voltage to a telephone set can vary considerably from one telephone system and one country to another, and the input voltage to any particular set in any given system varies substantially in accordance with transmission line impedance, most notably the distance of a specific telephone set from the central office.

In connection with the development of proposed new electronic telephone sets, preferably sets of universal, as nearly world-wide applicability as is feasible, it is desirable to provide a set that automatically generates a substantially constant speech network tip-to-ring supply voltage and speech network loop current, as will be described in detail in the section "Detailed Description," such as 6 volts±¼ volt and 25 ma in a typical example, regardless of the input supply voltage to the set.

In conventional American telephone networks (no active devices in the speech network), the impedance of the set is matched (by varistor networks built into the set) to that of the transmission line by drawing relatively high telephone set currents (such as 150 ma) on short loops and relatively low currents (such as 20 ma) on long loops. Such networks are inherently passive (no gain), and cannot boost transmitted signal level or increase receive sensitivity.

SUMMARY OF THE INVENTION

In view of the foregoing discussion, a specific object of this invention is to provide a substantially universal low-power electronic telephone set network and methods of operating, in which the loop current of the set is automatically initialized at a desired level irrespective of the input supply voltage and transmission line characteristics.

A significant advantage to such function is a saving in network power consumption because each telephone set would require the same operting current (e.g. 20 ma) independent of the loop length.

More general objects of the invention are to provide new and improved electronic telephone sets and controllers therefor, particularly methods and circuits for initializing the loop current at a desired level.

With the foregoing and other objects in view, a current initializing system in accordance with certain aspects of the invention is used in combination with a telephone set of the type wherein an input supply voltage is applied to input terminals of the set to power the speech network. In accordance with certain features of this invention, a variable conductance device is connected between the input terminals and the speech network so as to establish a loop current at a selected node in the speech network that is a function of the supply voltage and the conductivity of such device. The loop current is then monitored, and the conductance of the device is varied accordingly to initialize the loop current at a desired level independent of the supply voltage.

In one embodiment, the variable conductance device includes a Darlington driver circuit connected between the input terminals and the speech network so as to set the speech network supply voltage. Preferably, a plurality of resistors are selectively connected to the base node of the Darlington driver in a sequence individually and collectively so as to decrease the conductivity of the driver progressively in a series of steps until the desired loop current has been established.

The monitor circuit may include a Schmitt trigger circuit for sensing the loop current and generating a corresponding binary output whenever the loop current is above a preset range, and for operating a controller to progressively lower the conductivity of the variable conductance device in a series of discrete steps until the trigger output changes state.

Other objects, advantages and features of the invention will be apparent from the following detailed description of specific examples and embodiments thereof, when read in conjunction with the accompanying drawings.

DETAILED DESCRIPTION

Figure 1:
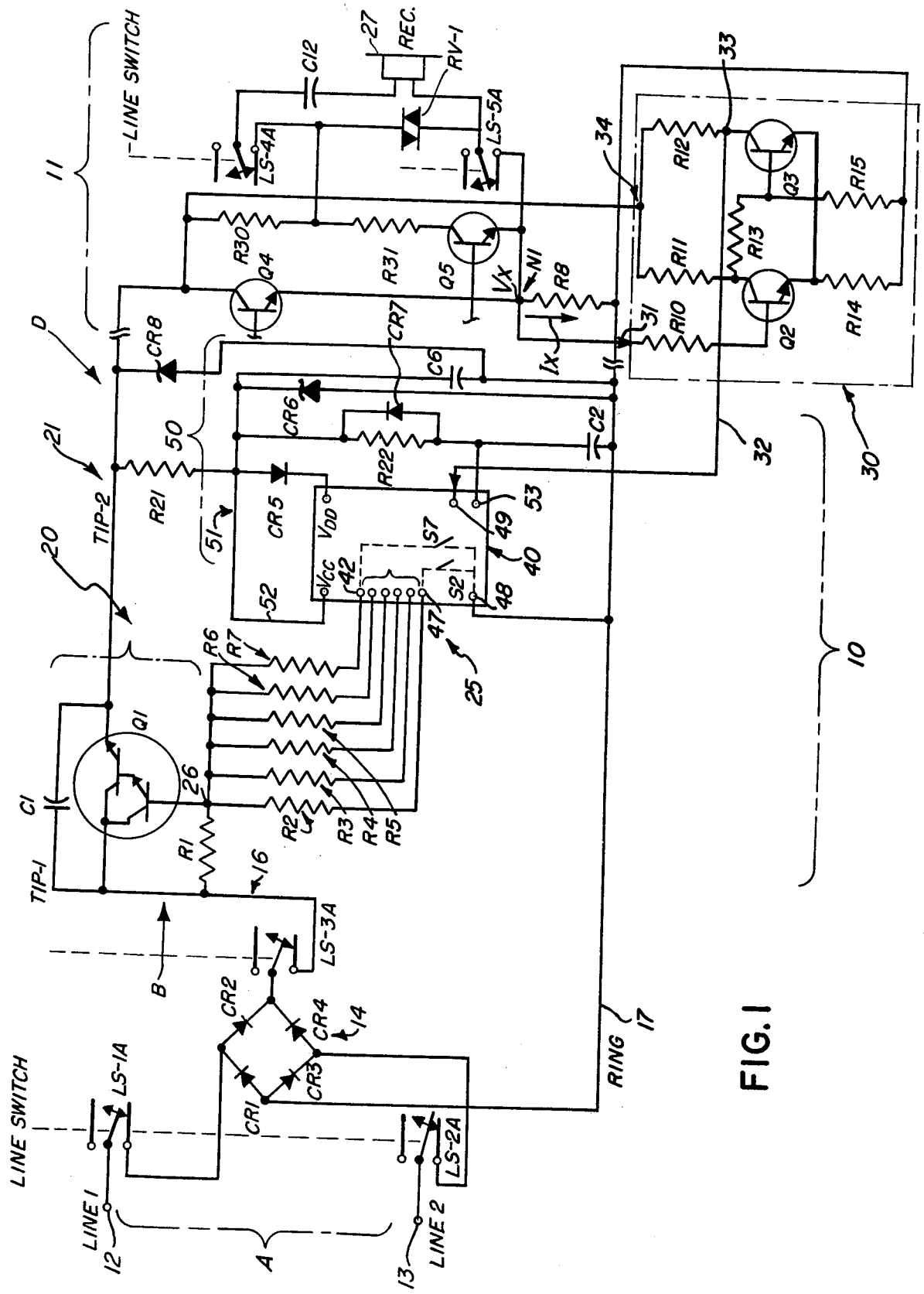
FIG. 1 is a circuit diagram of a loop-current initialization circuit in accordance with one specific embodiment of the invention.

Referring now in detail to the drawings, and particularly to FIG. 1, there is illustrated a circuit 10 in accordance with one specific embodiment of the invention, for monitoring and automatically initializing the loop circuit of an electronic telephone set speech network 11 at a desired level, such as 20–25 ma in a typical example, independent of the transmission-line loop length and thus line impedance.

In one specific example of an electronic telephone set illustrated in the drawings, when the telephone handset is taken off-hook a first set of conventional line-switch contacts LS-1A, LS-2A, and LS-3A close, at which time a D.C. input signal "A" from the central office is applied to the telephone set via input terminals 12 and 13, in conventional fashion. In various telephone systems, the nature and characteristics of the input signal can vary somewhat from one country and system to another. In general, the type of signal under consideration in this example is a modulated D.C. carrier wave having a typical range of eight to twenty-four volts, depending on the telephone system and depending primarily on the transmission-line loop length; that is, the length and impedance characteristics of the transmission line from the central office to the particular telephone set in question.

The input signal A is routed through a polarity guard 14, consisting of a diode bridge CR1 to CR4, to provide an operating voltage B (essentially identical to the input Signal A) between a "tip-1" lead or bus 16 and a "ring" lead 17, which may be regarded as a common circuit ground for the purposes of this application. Preferably, the bridge 14 is also used with additional circuits (not shown herein) in a ringing circuit for the set, as described in my copending application "Tone Ringing Circuits for Telephone Sets," Ser. No. 67,080, filed Aug. 16, 1979 (herein incorporated by reference).

The input signal B on the tip-1 bus 16 is applied to a variable conductance device 20, such as a conventional Darlington driver circuit Q1 connected as shown, via a base resistor R1 and a by-pass capacitor C1, between the tip-1 input bus 16 and a "tip-2" output drive bus 21 for the telephone set speech network 11. As is well known, in such a circuit configuration, the Darlington pair Q1 provides a non-amplified output voltage (D) on the tip-2-drive bus 21, which is a function of the input supply voltage B and which, in this circuit, is employed to drive the speech network 11 and other components of the set, as will be explained in further detail hereafter.

In accordance with the principles of this invention, a control circuit 25 is provided to vary the conductance of the device 20 so as to vary the tip-2 supply voltage and thereby preset the telephone set loop current at a desired level, as will be explained in further detail hereafter. In the specific embodiment illustrated, the control circuit 25 includes a plurality of parallel resistors (such as six resistors in one example, designated R2 through R7) that may be selectively connected in various combinations between a base node 26 of the Darlington driver Q1 and the ring lead 17 so as to decrease the conductivity of Q1 progressively in a series of steps, which decreases the tip-2 supply voltage and thus the loop current in a corresponding series of steps.

Figure 2:
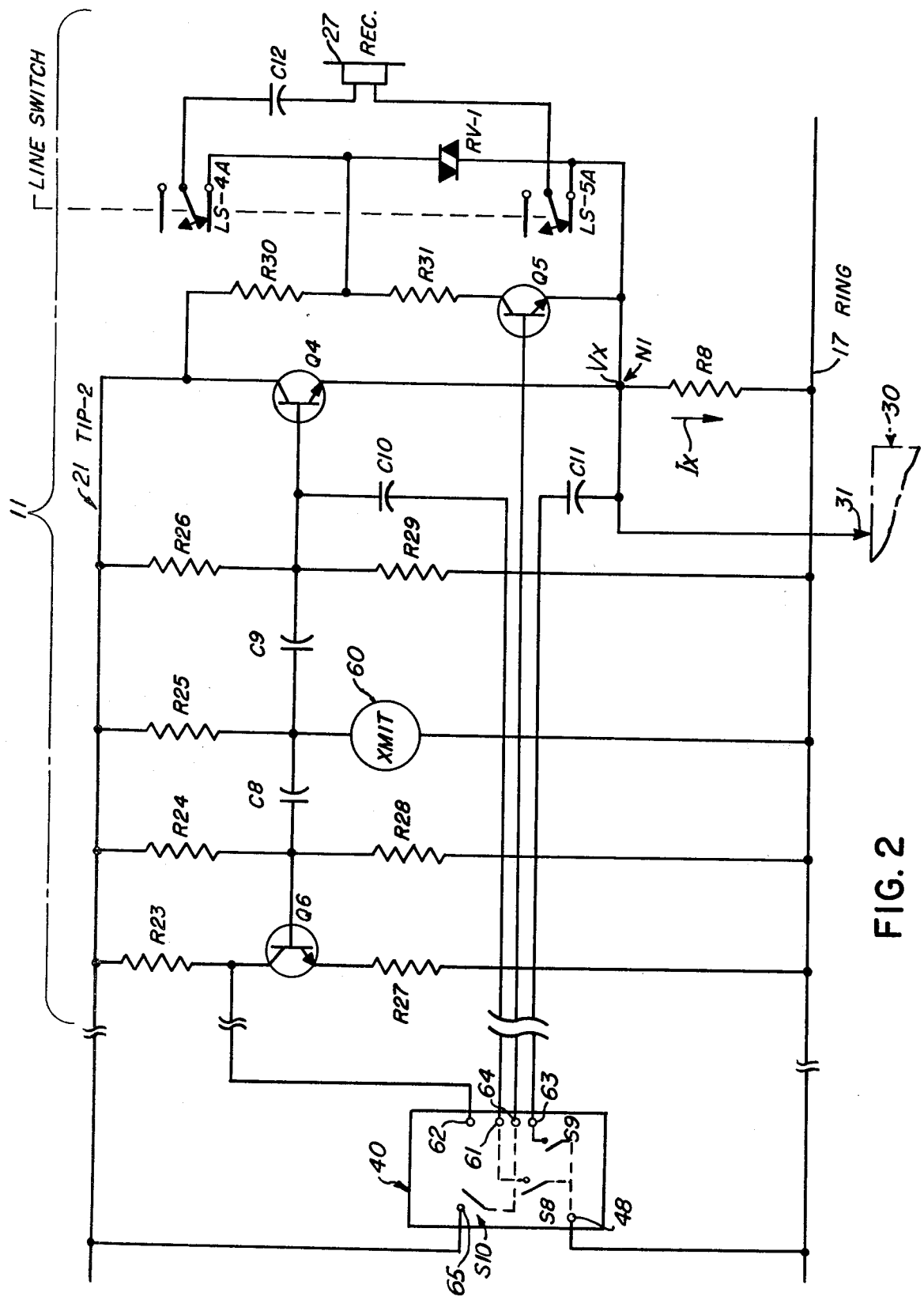
FIG. 2 is a circuit diagram of a particular form of speech network with which the initializatin circuit of FIG. 1 can be used.

When the telephone set first goes off hook, none of the resistors R2-R7 is connected the Q1 base node 26, and Q1 thus saturates (turns full ON) due to base current through R1 so that the Q1 output voltage on the tip-2 bus 21 is essentially equal to the full input supply voltage A from the central office, at the input terminals 12-13. At this time, the telephone receiver 27 and various other components of the speech network are connected between the tip-2 bus 21 and the ring lead 17, as will be described and as is generally conventional in telephone networks, the receiver being connected at this time in the circuit by an additional pair of line-switch contacts LS-4A and LS-5A that close when the handset is taken off hook. The speech network 11 may be of any conventional configuration so far as the present invention is concerned, or may be of a special design as illustrated in FIG. 2 as discussed in further detail hereafter.

As the speech network 11 is so connected and initially powered between tip-2 and ring at essentially the input supply voltage A, a corresponding loop current (designated $I_X$) is established which produces a voltage $V_X$ between a selected circuit node N1 in the speech network and the ring lead 17 through a resistor R8, the node N1 being chosen as an intermediate node or bus connected as shown in the network 11 on the ring side of the telephone receiver 27. Depending on the effective resistance of the various network components connected between the tip-2 bus and the node N1, the node voltage $V_X$ establihsed at N1 is a function of the tip-2 supply voltage which also sets the value of the loop current $I_X$.

For example, the full line input voltage to the set might range from 8-24 volts, resulting in a loop current $I_X$ o 30 to 100 ma. In a typical example of use of the invention, it is desired to regulate the loop current via adjustment of Q1 to an operating range where the tip-2 voltage is set at 6 volts$\pm\frac{1}{4}$, $V_X$ is $2\frac{1}{4}$ volts$\pm\frac{1}{4}$, and $I_X$ is in the range of 20-25 ma.

To achieve this current-initialization function, a circuit 30 is provided for monitoring the loop current, by sensing the node voltage $V_X$, and for operating the control circuit 25 so as to progressively lower the conductivity of Q1 in a series of discrete steps until the loop current has been reduced to the desired level. In this example, the circuit 25 functions to selectively connect resistors R2-R7 to the base node 26 of Q1 individually and collectively in a sequence so as to progressively lower the conductivity of Q1 in a sequence of incremental steps until the desired loop current level has been reached.

In the specific embodiment illustrated, the monitor circuit 30 comprises a generally conventional Schmitt trigger circuit including transistors Q2 and Q3 and a resistor network R10-R15, connected as shown between the node N1, the tip-2 bus 21, and the ring lead 17 and having preset threshold and hysteresis values. The node N1 to be monitored is connected to one input (31) of the trigger 30, and the trigger output (32) at anode 33 serves as a binary input to operate the control circuit 25 as will be explained hereafter. The tip-2 bus 21 is connected to an additional input node (34) to serve as a supply voltage for operating the trigger circuit.

As is well known, a Schmitt trigger circuit 30, connected as shown, generates a binary output 32 ("HIGH" or "LOW", +V or zero volts in this example), depending on whether or not the input voltage $V_X$ at the input 31 is above or below a predetermined reference level set by the tip-2 input, Q2, Q3, and the resistor values in the network R10 to R15. In effect, the trigger circuit converts the unknown voltage $V_X$ to be monitored (which is essentially an analog signal) into a digital format (HIGH or LOW) with respect to the threshold level of the device, which can conveniently be used as a binary trigger input to operate a digital control circuit 25 in a preset sequence of steps.

In the specific embodiment illustrated, the control circuit 25 includes a digital logic circuit or controller, preferably an integrated circuit chip 40 of the type sometimes referred to as a "microprocessor" or "microcomputer" chip, which can be of any known design capable of performing what are essentially stepping switch functions required to connect the Q1 base resistors R2-R7 to the ring lead 17 in a preset sequence in response to binary inputs from the monitor 30. In the specific example illustrated, the resistors R2-R7 are connected to a corresponding set of pins 42 . . . 47 of the chip 40, which has a corresponding set of gates or switches, two of which are schematically designated in FIG. 1 as switches S2 and S7, that can be activated in a preset sequence to connect the corresponding resistors R2-R7 to the ring lead 17 via a reference pin 48 of the chip 40 that is connected to the ring lead 17.

The monitor circuit output 32 is connected to a trigger input pin 49 of the chip 40, which operates in conventional fashion to operate the switches S2-S7 in the preset series of steps so as to progressively reduce the loop current in a corresponding series of steps until the desired level has been reached and the trigger output voltage 32 falls to zero to terminate the switching sequence.

Specifically, as discussed above, the driver Q1 initially turns full ON at the start of each cycle, to establish an initial, maximum tip-2 voltage and loop current $I_X$, the circuit component parameters being chosen so that the initial current $I_X$ is essentially always at least somewhat above the desired operating level, given the longest loop lengths and lowest input voltages likely to be encountered in use of the set. Accordingly, the trigger 30 invariably operates at least once per cycle to produce a HIGH input to the trigger input pin 49, which in a typical example connects a first one of the resistors R2-R7, for example R2, between the base node 26 and ring. This accordingly lowers the voltage at the base of Q1 by a preset small amount and takes Q1 out of saturation, thus reducing the tip-2 voltage and the node voltage $V_X$ by a corresponding small increment.

If the node voltage is still above the threshold of the trigger 30 after this first step, then a HIGH continues to be generated at the trigger input pin 49, which for example disconnects R2 from the ring lead 17 and sinks R3 to the ring lead, R3 having a value set to further decrease the Q1 output voltage by a second small step. As will be readily apparent, the process continues for a preset sequence of, for example, up to thirty-one incremental steps involving progressively lower resistance combinations of the resistors R2-R7 until, at some point in the cycle, the node voltage $V_X$ drops below the threshold voltage of the trigger circuit 30, and a LOW signal appears at the trigger output 32 to halt the sequence. At this point, the initialization process has been completed and the D.C. loop current $I_X$ then flowing through the set has been established within the desired range. Of course, the selection of values for the resistors, such as R2-R7, and the specific sequences of connecting them in various combinations in a desired number of steps for a desired sequence of operation for a particular set will be readily apparent.

Controller 40

Obviously, the specific details of the controller 40, or "microcomputer" in modern parlance, are not important to the practice of the invention; and, in the embodiment illustrated, the control circuit 25 can be any known type of switching circuitry that is capable of responding to binary inputs from the monitor circuit 30 to operate a set of switches such as S2-S7 in a given sequence, such as an enable/disable pulse generator (e.g., 555 timer) driving a synchronous multi-bit counter (e.g., 74161IC) that in turn addresses a multi-line decoder (e.g., 74154 IC) for selecting the desired resistors R2-R7.

In a specific example, the control circuit includes a CMOS "single-chip microcomputer," as generally described in an article "MAC-4: A Single-Chip Microcomputer," by W. F. Chow and W. W. Troutman, *The Bell System Technical Journal*, vol. 58, No. 4, pp. 959-962 (April 1979). This is a versatile, lower power microcomputer chip that can be used as a controller for various functions in a telephone set, including the loop-current initialization functions of this application, and can be driven solely from the central office input signals, without the use of auxiliary power sources.

In the specific embodiment illustrated in FIG. 1, when the telephone receiver first goes off hook, and the initial, full line voltage appears on the tip-2 bus 21, power is applied to the chip 40 in generally conventional fashion by a network 50 including a resistor R21 connected between the tip-2 bus 21 and an intermediate microcomputer drive bus 51; a lead 52 connecting the bus 51 to a first power input pin $V_{CC}$; a diode CR-5 connecting the bus 51 to a second power input pin $V_{DD}$; a Zener diode CR-6 and capacitor C6 connected in parallel between the bus 51 and the ring lead 17; a Zener diode CR-8 connected between the tip-2 bus 21 and the ring lead 17; and a reset circuit including R22, CR-7, and a capacitor C2 connected as shown between the bus 51 and the ring lead 17 and to a reset pin 53 of the chip. After the chip 50 has been so turned ON and reset each time the telephone set goes off hook, the first routine performed is preferably the current-initialization routine forming the subject matter of this application.

Further details of the MAC-4 microcomputer and operation may be obtained from the following copending patent applications, herein incorporated by reference:

(1) V. K-L. Huang - R. L. Ruth, Ser. No. 974,426, filed Dec. 29, 1978, entitled "Data Processing Apparatus Having Opcode Extending Register";

(2) D. E. Blahut - D. H. Copp - D. C. Stanzione, Ser. No. 974,425, filed Dec. 29, 1978, entitled "Data Processing Apparatus Providing Variable Operand Width Operation";

(3) D. E. Blahut - D. H. Copp - D. C. Stanzione, Ser. No. 974,363, filed Dec. 29, 1978, entitled "Data Processing Apparatus Providing Autoloading of Memory Pointer Registers";

(4) D. E. Blahut - D. H. Copp - D. C. Stanzione, Ser. No. 974,361, filed Dec. 29, 1978, entitled "Data Processing Apparatus Providing Autoincrementing of Memory Point Registers";

(5) D. E. Blahut - R. L. Ukeiley, Ser. No. 71,712, filed Aug. 31, 1979, entitled "Microprocessor Using a Double Op Code Instruction";

(6) D. E. Blahut - V. K-L. Huang - R. L. Townsend, Jr., Ser. No. 71,750, filed Aug. 31, 1979, entitled "Microcomputer Arranged for Direct Memory Access"; and (7) V. K-L. Huang, Ser. No. 71,717, filed Aug. 31, 1979, entitled "Special Address Generation Arrangement".

Speech Network 11

While, as mentioned above, the speech network 11 may be of any known configuration, in a specific example of a central-office powered, microcomputer-controlled telephone set illustrated in FIG. 2, the receiver 27 and a conventional transmitter 60 are connected across the tip-2 and ring leads 21 and 17 by an R-C network including resistors R23-R31 (and R8 previously described) and capacitors C8-C12, arranged as shown; and a set of three transistors Q4, Q5 and Q6 connected in the network as shown and selectively operated by the microcomputer 40 as will be described.

After the current initialization process described above has been completed and the set is ready for operation to receive or transmit speech signals, the speech network 11 is normally conditioned by the microcomputer 40 in a "receive" mode, in which the transistor Q4 serves as a conventional amplifier stage for received signals. For this purpose, a capacitor C10, connected between the base of Q4 and a microcomputer input pin 61, is connected to the ring lead 17 by a normally closed microcomputer switch designated S8, which configures Q4 for maximum gain of an emitter injected signal. (At this time, Q5 is turned OFF, and an emitter bypass capacitor C11 is disconnected from the circuit by the microcomputer 40, as will be discussed hereafter.)

In this configuration, a received speech signal is superimposed on the intializing current flowing through the set, which flows through Q4, with the received signal per se appearing at the emitter of Q4. The fully amplified receive signal appears at the collector of Q4 and is applied to the receiver 27 of the telephone set via R30 and C12, thence to the intermediate circuit bus or node N1 discussed above and to the ring lead 17 via R8 as described above. A varistor RV-1 is connected in parallel with the receiver 27, between R30 and N1 to suppress clicks, as is conventional.

Although components C10, C11 and Q5 configure Q4 in the "receive mode" as described above, D.C. current flows through R25 and the transmitter 60 to enable or "arm" the transmitter for normal operation. The speech network 11 remains in the receive mode until the acoustic input to the transmitter 60 exceeds a given threshold level, at which time a transmit signal applied through C8 to amplifier stage Q6 provides sufficient input drive to operate the microcomputer 40 via Q6 to alter the speech network from the receive mode to a "transmit mode." For this purpose, the transistor Q6 serves as a peak detector or switch, that amplifies the signal across the transmitter 60 and applies a switching signal to an interrupt pin 62 of the microcomputer 40, which opens the microcomputer switch S8 to disconnect C10 from the Q4 base and which also connects the emitter bypass capacitor C11 to the ring lead 17 via a microcomputer input pin 63, a microcomputer switch designated S9, and the ring-lead reference pin 48. Also, at this time, the transistor switch Q5 is turned ON by the microcomputer, by sourcing the base of Q5 to the tip-2 bus 21 via a pin 64, a switch designated S10, and a reference pin 65 connected to the tip-2 bus 21.

In the transmit mode, the output of the transmitter 60 is applied to the base of Q4 through the capacitor C9, for amplification and transmission to the line. In this mode, the transistor Q5 serves to apply sidetone to the receiver 27 via a voltage divider network consisting of R30, R31, and the resistance of Q5, in which the receiver 27 is connected to the juncture of R30 and R31 so that a predetermined fraction of the transmitted signal is routed to the receiver 27 as sidetone, as is generally well known in the art.

With these arrangements, a simple solid-state, voice-activated speech network is provided for separating the transmit signals from the receive signals, amplifying each with a single transistor Q4 operating in two modes, and generating sidetone when transmitting, which can be powered solely from the central office and controlled by a relatively simple microcomputer chip. A continuation-in-part application "Speech Network for Telephone Sets," Ser. No. 86,024, was filed Oct. 17, 1979, relating to the speech network described in the preceding section.

While one specific embodiment of the invention has been described in detail herein, it should be obvious that various modifications may be made from the specific details described, without departing from the spirit and scope of the invention.

What is claimed is:

1. A circuit for initializing the loop current of a telephone set of the type wherein a central office D.C. input supply voltage is applied to input terminals of the set to power the telephone set, which voltage can vary from one telephone set to another depending on transmission line characteristics and other variables, the initializing circuit comprising:
    a variable conductance device connected in series between the input terminals and the speech network so as to establish a series D.C. loop current at a selected node in the speech network that is a function of the input supply voltage and of the conductance of said device; and
    means for monitoring the loop current and for varying the conductance of said variable conductance device so as to set the loop current at a level within a preset, desired range, independent of the voltage applied to the input terminals of the set.

2. A circuit as recited in claim 1, wherein the variable conductance device includes a Darlington driver connected between a "tip" input bus and a "tip-2" supply bus, the speech network being connected between the tip-2 bus and a "ring" lead.

3. A circuit as recited in claim 2, wherein the monitoring and varying means includes means for selectively connecting a plurality of resistors to the base node of the Darlington driver in a sequence so as to decrease the conductivity of the driver progressively in a series of steps so as to decrease the tip-2 supply voltage and thus the loop current in a corresponding series of steps until the loop current has been established within a desired range.

4. A circuit as recited in claims 1, 2 or 3, wherein the monitoring and varying means includes a Schmitt trigger circuit for sensing the loop current and for generating a corresponding binary output whenever the loop current is above a desired range so as to lower the conductivity of the variable conductance device.

5. A circuit as recited in claim 4, wherein the monitoring and varying means includes a controller responsive to the Schmitt trigger output, for progressively lowering the conductivity of the variable conductance device in a series of discrete steps until the trigger circuit output changes state.

6. A circuit for initializing the loop current of a telephone set of the type wherein the central office voltage is applied to input terminals of the set to power the telephone set, which voltage can vary from one telephone set to another depending on transmission line characteristics and other variables, the initialzing circuit comprising:
    a Darlington driver connected between a "tip" input bus and a "tip-2" supply bus, the speech network being connected between the tip-2 bus and a "ring" lead, so that the driver establishes a loop current at a selected node in the speech network that is a function of the supply voltage and of the conductivity of the driver;
    a plurality of resistors selectively connectable between the base node of the driver and the ring lead so as to decrease the conductivity of the driver by corresponding amounts;
    a circuit for monitoring the loop current and for generating a corresponding binary output signal whenever the loop current is above a desired range; and
    a controller, responsive to the corresponding binary output signal, for selectively connecting the resistors to the base node of the driver in a sequence set individually and collectively to decrease the conductivity of the driver progressively in a series of steps so as to decrease the tip-2 supply voltage and thus the loop current in a corresponding series of steps until the loop current has been established at a level within a desired range.

7. A circuit as recited in claim 6, wherein the monitoring circuit comprises a Schmitt trigger circuit having one input connected to the selected node in the speech network, a second input connected to the tip-2 bus, and an output connected to a trigger input of the controller.

8. A method of initializing the loop current of a telephone set of the type wherein a central office D.C. input supply voltage is applied to input terminals of the set to power the telephone set, which voltage can vary from one telephone set to another depending on transmission line characteristics and other variables, which method comprises:

monitoring the series D.C. loop current at a selected node in the speech network to provide an output based on the level of the loop current with respect to a preset, desired range; and in response to the monitor output, varying the conductance of a variable conductance device connected in series between the input terminals and the speech network so as to set the loop current at a level within the preset range, independent of the supply voltage.

9. A method as recited in claim 8, wherein the variable conductance device is a Darlington driver, and wherein the varying step comprises:

selectively connecting a plurality of resistors to the base node of the Darlington driver in a sequence individually and collectively so as to decrease the conductivity of the driver progressively in a series of steps so as to decrease the loop current in a corresponding series of steps until the loop current has been established within the desired range.

10. A method of initializing the loop current of a telephone set of the type wherein the central office voltage is applied to input terminals of the set to power the telephone set, which voltage can vary from one telephone set to another depending on transmission line characteristics and other variables, which method comprises:

monitoring the loop current at a selected node in the speech network;

generating a corresponding binary output signal whenever the loop current is above a desired range; and selectively connecting a plurality of resistors individually and collectively between the base node of a Darlington driver and a "ring" lead of the set so as to decrease the conductivity of the driver by corresponding amounts, the driver being connected between a "tip" input bus and a "tip-2" supply bus, the speech network being connected between the tip-2 bus and the ring lead so that the driver establishes a loop current at a selected node in the speech network that is a function of the supply voltage and of the conductivity of the driver, the resistors being connected individually and collectively to the base node of the driver in a sequence set to decrease the conductivity of the driver progressively in a series of steps so as to decrease the tip-2 supply voltage and thus the loop current in a corresponding series of steps until the loop current has been established at a level within a desired range.

* * * * *